UNITED STATES PATENT OFFICE.

EDWARD D. KENDALL, OF BROOKLYN, NEW YORK.

COMPOSITION OF MATTER FOR ELECTRICAL INSULATION.

SPECIFICATION forming part of Letters Patent No. 339,787, dated April 13, 1886.

Application filed August 28, 1885. Serial No. 175,605. (No specimens.)

*To all whom it may concern:*

Be it known that I, EDWARD D. KENDALL, a citizen of the United States, residing in the city of Brooklyn, county of Kings, and State of New York, have invented a new and useful Composition of Matter for Electrical Insulation, of which the following is a specification.

My composition consists of the following ingredients—viz.: first, the so-called "wax-tailings," known also as "still-wax," of the petroleum-refining works, which is produced by distilling petroleum residues with furnace heat and with the aid of superheated steam, and which is the last distillable product obtained from the still, the final residue being a friable coke; second, the natural gum known as "chicle;" third, sulphur, or a suitable body containing sulphur; fourth, a small proportion of vegetable or animal oil or fat. The said wax-tailings has hitherto been a comparatively useless product, and has been mostly consumed in furnaces as a fuel and to get rid of it. The said gum chicle may be sufficiently refined for my purpose by simply macerating or kneading it in hot water, which dissolves away the saccharine and gummy matters associated with the natural hydrocarbons that constitute the greater part of the said chicle.

To prepare my new composition of matter, I take wax-tailings, thirty-two parts, by weight; chicle, sixteen to thirty-two parts; sulphur, four to eight parts; oil, one to two parts. I heat the wax-tailings in a suitable vessel until quite fluid. Then stir in the oil, and afterward add the chicle, slightly increasing the heat, with constant stirring, until the chicle is melted and well mixed with the first-mentioned materials. The mixture is then to be allowed to cool until increasing viscidity is apparent, when the sulphur, finely powdered or in the form of flowers of sulphur, is to be added and thoroughly commingled with the mass by stirring. The heat is then to be slowly increased, with constant and vigorous stirring. The mass soon becomes more fluid; but when it has become heated a few degrees above the melting-point of sulphur (111° centigrade) a process of vulcanization commences and the mass begins to thicken. Its color becomes darker, and it soon shows a tendency to agglutinate and separate from the surfaces of the containing-vessel, at which point the process of preparation is complete. If the temperature be rapidly raised many degrees above the melting-point of sulphur, the vulcanization takes place more rapidly; but the action is not so readily controllable as when excessive heating is avoided. The resulting product somewhat resembles gutta-percha. It becomes soft when heated, in which state it may be pressed into mold or rolled into sheets, and the shape so given will be retained after the material becomes cold. When cold, it has perceptible elasticity, is tough and flexible, and is a non-conductor of electricity.

In preparing my new composition of matter I do not confine myself to the exact proportions of materials stated, as these may be varied somewhat without departing from my invention. I do not confine myself to the use of any particular oil or fat; but I prefer to use cotton-seed oil. I do not confine myself to the exact method of vulcanizing above described, as the mixture, after the addition of the sulphur and before the final heating, may be put into molds or spread on cloth, or used to coat wires, and the vulcanization by heat effected in a vulcanizing-chamber, (like those used in vulcanizing caoutchouc,) or otherwise; nor do I confine myself to the use of sulphur alone, because the vulcanization may be effected by conveying the sulphur into the mass by means of chloride of sulphur or other sulphur-bearing substance.

What I claim as new, and desire to secure by Letters Patent of the United States, is—

The herein-described composition of matter, consisting of the so-called "wax-tailings," chicle, sulphur, and oil, in the proportions substantially as described.

In testimony whereof I have signed my name to this specification in the presence of two subscribing witnesses.

EDWARD D. KENDALL.

Witnesses:
C. W. THOMPSON,
G. W. CALLENDER.